3,407,035
PRODUCTION OF ALKALINE EARTH METAL PYROPHOSPHATES
Chung Yu Shen, St. Louis, Mo., assignor to Monsanto Company, St. Louis, Mo., a corporation of Delaware
No Drawing. Filed Dec. 27, 1966, Ser. No. 604,663
11 Claims. (Cl. 23—109)

ABSTRACT OF THE DISCLOSURE

A process for producing crystalline pyrophosphates selected from the group consisting of alkaline earth metal pyrophosphates, alkaline earth metal-alkali metal pyrophosphates, alkali earth metal-ammonium pyrophosphates and mixtures thereof is disclosed. The process comprises (a) forming a reaction medium by adding in any order: solid pyrophosphoric acid, an alkaline earth metal source and water and (b) maintaining said reaction medium at a pH of from about 1 to about 6, at a temperature of from about 0° C. to about 100° C. and at a water concentration of at least about 80% by weight based upon the total weight of said reaction medium for a time sufficient to form said crystalline pyrophosphates.

---

This invention relates to the production of alkaline earth metal pyrophosphates. More particularly, this invention relates to a process for the production of crystalline alkaline earth metal pyrophosphates using solid pyrophosphoric acid as a raw material.

Crystalline alkaline earth metal pyrophosphates have heretofore been prepared by the thermal dehydration of the appropriate orthophosphates of the various alkaline earth metals. For example, dicalcium pyrophosphate ($Ca_2P_2O_7$) is prepared by the molecular dehydration of dicalcium orthophosphate ($CaHPO_4$). This method involves the use of relatively high temperatures, generally above 500° C. and furthermore produces only the anhydrous form of calcium pyrophosphate. An additional process has been described which produces calcium pyrophosphate dihydrate by adding an aqueous solution of $CaCl_2$ to an aqueous solution of tetrapotassium pyrophosphate, maintaining the resulting solution at a pH of about 6 and at a temperature of about 45° C. to form an amorphous calcium pyrophosphate. After about two weeks crystals of calcium pyrophosphate dihydrate are formed from the amorphous calcium pyrophosphate. In most instances, products are formed which are contaminated with calcium-potassium pyrophosphate when such procedures are used.

It is believed, therefore, a process which enables the production of alkaline earth metal pyrophosphate in the anhydrous or hydrated form at high purities and at good yields and which utilizes relatively low temperatures and which can be employed to selectively crystallize hydrates or anhydrous alkaline earth metal pyrophosphates as desired is an advancement in the art.

In accordance with this invention, it has been found that crystalline alkaline earth metal pyrophosphates having high purities can be prepared by forming a reaction medium by adding in any order: solid pyrophosphoric acid, an alkaline earth metal source, and water and maintaining the reaction medium under controlled conditions of temperature, water concentration, and pH. It has additionally been found that by controlling the temperature within selected temperature ranges that the process is selective in producing particular forms of crystalline alkaline earth metal pyrophosphate.

Solid pyrophosphoric acid, $H_4P_2O_7$, is a specific chemical compound having a $P_2O_5$ content of 79.76% and is not to be confused with the syrupy liquid having a $P_2O_5$ content of from about 78% to about 82% which is sometimes known as "liquid pyrophosphoric acid." The beforementioned liquid is a mixture of pyro, ortho and polyphosphoric acids and is not suitable in the practice of this invention. Solid pyrophosphoric acid is known to exist in at least two forms—a Form I crystalline material which melts at 54° C. and a Form II crystalline material which melts at about 71° C. When heated to its melting temperature, solid pyrophosphoric acid undergoes a rearrangement to produce a mixture of pyro, ortho and higher polyphosphoric acids. Although any form of solid pyrophosphoric acid can be used in the practice of this invention, Form II is preferred since it is more thermally stable. Pyrophosphoric acid in an aqueous solution also hydrolyzes to form orthophosphoric acid and such hydrolysis is more rapid at relatively high temperatures, that is, at temperatures above 50° C.

Although relatively impure pyrophosphoric acid, that is, having a purity as low as about 90%, can be used in the practice of this invention, it is generally preferred to use a higher purity pyrophosphoric acid, that is, an acid having an $H_4P_2O_7$ assay of at least about 95%.

The other reactant used in the practice of this invention is an alkaline earth metal source. Any material which will ionize to form an alkaline earth metal ion and is more soluble in the reaction medium than the alkaline earth metal pyrophosphate can be used in the practice of this invention. Generally, it is preferred to use the alkaline earth metal bases, alkaline earth metal salts, and mixtures thereof. Calcium, barium, magnesium and strontium are the most common alkaline earth metals and will hence generally be more extensively utilized in the practice of this invention although any of the alkaline earth metal pyrophosphates can be produced. This invention is particularly suitable for the production of calcium pyrophosphate, a well-known polishing agent in dentifrices. One of the preferred embodiments of this invention, therefore, is the production of calcium pyrophosphate.

Illustrative of the suitable alkaline earth metal bases which can be used in practicing this invention are calcium hydroxide, barium hydroxide, magnesium hydroxide, calcium oxide, and barium oxide. Mixtures of the same alkaline earth metal oxides and hydroxides can be used to produce the corresponding alkaline earth metal pyrophosphate.

The alkaline earth metal salts of the lower alkyl carboxylic acids such as acetic, formic, butyric, and the like and the alkaline earth metal salts of the inorganic acids such as hydrochloric, sulfuric and carbonic can be used. Illustrative of the salts that can be used are calcium acetate, calcium chloride, calcium carbonate, barium carbonates, magnesium chloride, magnesium carbonate, magnesium butyrate, strontium carbonate, calcium sulfate, magnesium sulfate, and the like. Although any of the foregoing materials can be used, it is generally preferred when using an alkaline earth metal salt to use those which are water soluble to the extent of about 0.1% by weight in water at 25° C.

In most instances it is preferred to use the most common and relatively less expensive inorganic alkaline earth metal salts such as the chlorides, carbonates, and sulfates, or the alkaline earth metal oxides and hydroxides.

It is to be noted that the process of this invention is independent of the order of addition of water, solid pyrophosphoric acid and the alkaline earth metal source. All that is necessary is that the reaction medium be held at the specified conditions of temperature, concentration, and pH as will be described in more detail hereinafter. The reactants can be slurried together to form a reaction medium or the solid pyrophosphoric acid can be added to an aqueous slurry or solution of the alkaline earth metal source or the alkaline earth metal source can be added to an aqueous solution of pyrophosphoric acid. Additionally, each reactant, that is the solid pyrophosphoric acid and the alkaline earth metal source, can be each separately slurried or dissolved in water and metered into a reaction vessel to establish a controlled reaction medium. Particularly if a continuous process is used it is generally easier to maintain the desired reaction conditions, using aqueous solutions or slurries of the alkaline earth metal source and an aqueous solution of pyrophosphoric acid because with most conventional equipment and controls, it is easier to control the addition of liquids and slurries than the addition of solids.

When solid pyrophosphoric acid is added directly to the reaction medium, it is preferred to use particle sizes smaller than the openings in a U.S. Standard 4 mesh screen in order to achieve relatively rapid dissolution and to avoid local heating. When aqueous solutions of pyrophosphoric acid prepared by adding solid pyrophosphoric acid to water are used, it is preferred to use a solution which has a pyrophosphoric acid content of from about 5 to about 25% by weight. Solutions having a pyrophosphoric acid content of from about 10% to about 15% by weight are especially preferred in order to keep the water concentration in the reaction medium within the range of from about 85% to about 95%. To insure that degradation does not occur prior to the use of pyrophosphoric acid, it is preferred to keep the temperature of the pyrophosphoric acid solutions below room temperature, that is, below about 25° C.

Although alkaline earth metal sources can be added to the reaction medium in the solid form in the practice of this invention, it is generally preferred to use an aqueous solution or an aqueous slurry of the alkaline earth metal source in most instances. Furthermore, it is preferred to use those slurries and solutions which have a water content of from about 80% to about 95% in order to maintain the concentration of solids in the reaction medium more readily.

If it is desired, crystalline pyrophosphates can be prepared which contain both alkaline earth metals and alkali metals or which contain both alkaline earth metal and ammonium. These salts can be prepared if an alkali metal source or an ammonium source is present in the reaction medium under the reaction conditions specified. These salts are also highly insoluble and, therefore, precipitate readily from the reaction medium.

In general, any alkali metal source or ammonium source which will yield an alkali metal ion or ammonium ion in the reaction medium and is more soluble in the reaction medium than the pyrophosphate containing both the alkaline earth metal and the alkali metal or ammonium can be used to produce these pyrophosphates. Although any of the alkali metals or ammonium can be utilized to produce the foregoing pyrophosphates, it is generally preferred to produce salts containing ammonium, sodium or potassium and one of the preferred alkaline earth metals as hereinbefore specified.

Suitable alkali metal sources include the alkali metal or ammonium bases, such as the hydroxides and oxides and the alkali metal salts or ammonium salts of the lower alkyl carboxylic acids and the alkali metal salts or ammonium salts of the inorganic acids. Illustrative of the bases which can be used include sodium, potassium, and ammonium hydroxide oxide. Illustrative of the salts of the lower alkyl carboxylic acids include sodium acetate, potassium acetate, ammonium formate, sodium butyrate, potassium formate and the like. Illustrative of the salts of inorganic acids include sodium chloride, potassium chloride, sodium carbonate, potassium carbonate, ammonium chloride, ammonium sulfate and the like.

Examples of the mixed pyrophosphates containing both alkaline earth metals and alkali metals and ammonium which can be produced include the following:

| | | |
|---|---|---|
| $CaNa_2P_2O_7$ | $MgNa_2P_2O_7$ | $BaNa_2P_2O_7$ |
| $Ca(NH_4)_2P_2O_7$ | $MgK_2P_2O_7$ | $Ba(NH_4)_2P_2O_7$ |
| $CaK_2P_2O_7$ | $Mg(NH_4)_2P_2O_7$ | |

The pH of the reaction medium (as measured on the aqueous portion of the reaction medium) is held between about 1 and about 6 in the practice of this invention. At pH values above about 6, a hard-to-filter amorphous material is formed while at pH values below about 1 alkaline earth orthophosphates are formed adversely lowering the yield of pyrophosphates. It is preferred to hold the pH between about 2 and about 5 in most cases. In some instances, depending upon the particular raw materials used, the addition of a material other than the raw materials, can be utilized to adjust the pH. In general, any water soluble acid, base or salt, which will form a soluble compound in the reaction medium and which will impart the desired pH to the reaction medium can be used. If the pH needs to be lowered a dilute aqueous solution of a mineral acid such as hydrogen chloride is generally a satisfactory material. The chloride salts which are formed in the reaction medium will be water soluble, therefore, will not contaminate the crystalline pyrophosphates which are formed. The amount of material used to adjust the pH will be dependent upon the particular alkaline earth pyrophosphate being produced, the material used to adjust the pH and the alkaline earth metal source. All that is necessary in the selection of a material for adjusting the pH is that the salts produced by reactions with the ions present in the reaction medium be soluble in the reaction medium. In most instances, however, it is preferred to merely adjust the amount of solid pyrophosphoric acid that is added to control the pH.

Temperatures of the reaction medium of from about 0° C. to about 100° C. can be used. The temperature used within this range will be dependent upon the degree of hydration that is desired. For example, in the production of calcium pyrophosphate, at reaction temperatures from about 0° C. to about 40° C. the tetrahydrate is formed. Reaction temperatures of from about 45° C. to about 80° C. produce the dihydrate, while at above 80° C. to about 100° C. anhydrous calcium pyrophosphate crystallizes out of the aqueous medium. To achieve a product containing essentially calcium pyrophosphate tetrahydrate, the temperature should be at the lower portion of the foregoing range, that is, from about 0° C. to about 20° C. To yield a product containing essentially the dihydrate form temperatures of from about 45° C. to about 60° C. are suitable. Reaction temperatures above about 80° C. and below about 100° C. produce products which are essentially anhydrous calcium pyrophosphates. The other alkaline earth metals behave similarly although different hydrates are formed. For example, at reaction temperatures of from about 25° C. to about 40° C., magnesium pyrophosphate hexahydrate is formed while at temperatures near the boiling point of the solution (from about 90° C. to about 100° C.) anhydrous magnesium pyrophosphate is formed.

The water concentration in the reaction medium should be maintained above about 80% by weight to enable adequate control of the process. Although there is no critical maximum water concentration in order to achieve the benefits of this invention, it is generally preferred to use water concentrations below about 95% in order to avoid problems relating to disposal of an excessive amount of water; however, in some instances, if water concentrations greater than 95% are used, the water can be recovered and recycled to maintain the desired water concentration in the reaction medium. Water concentrations of less than about 80% can result in the precipitation of salts which would normally be water soluble at the higher water concentrations, therefore, are to be avoided. Thus, in most instances, it is preferred to maintain a water concentration in the reaction medium of from about 90% to about 95%.

Since alkaline earth metal pyrophosphates and the mixed alkaline earth metal-alkali metal pyrophosphates are extremely insoluble in water, salts having high purities are produced by using the specified reaction conditions. Generally salts having a purity of at least about 90% (based upon the total phosphorus content of the precipitated material) are prepared. These high purity compounds will also be produced even if the $H_4P_2O_7$ content of the pyrophosphoric acid is relatively low since the other alkaline earth phosphates which can be formed are normally more soluble in the reaction medium within the water concentrations as herein specified than the pyrophosphates, therefore, will not readily crystallize from the reaction medium to cause contamination of the crystalline pyrophosphates.

The pyrophosphates produced by the process of this invention are crystalline in nature, that is, these compounds will generally produce a relatively sharp X-ray diffraction pattern. In some instances, however, particularly at the higher pH ranges, relatively fine crystals can be formed which by using normal analytical techniques can be mistaken for those compounds which are amorphous in character.

High yields are achieved in the practice of this invention. "Yields" are based upon the amount of crystalline produced pyrophosphate calculated on the $H_4P_2O_7$ charged to the reaction medium as distinguished from the weight of the solid pyrophosphoric acid. Yields above about 90% based upon the $H_4P_2O_7$ charged are obtained. Under preferred conditions yields above 95% can be achieved. Since the alkaline eath metal pyrophosphates are insoluble in the reaction medium, recovery as a solid is a relatively simple operation because any conventional means of separating solids from liquids can be used such as filtration, centrifugation, settling and the like. The mixed alkaline earth metal-alkali metal pyrophosphates can also be recovered in a similar manner.

If desired, however, the reaction mixture can be used directly without a recovery step such as in the preparation of animal food, supplements and dentifrice compositions. The method of utilization of the pyrophosphates will be dependent upon the particular end use that is desired. However, using the reaction mixture directly without separation is particularly suitable when high purity alkaline earth metal hydroxides, high purity pyrophosphoric acid and water are used since the only product formed other than alkaline earth metal pyrophosphates is water. The water formed as well as the water used to obtain the desired concentration can either be absorbed in the composition in which the alkaline earth metal pyrophosphate is to be utilized or subsequently removed by drying.

To more specifically illustrate the process of this invention, the following non-limiting examples are presented. All parts, proportions and percentages are by weight unless otherwise indicated.

EXAMPLE 1

About 296 parts of calcium hydroxide are dissolved in about 3,000 parts of water. About 366 parts of crystalline pyrophosphoric acid (79.6% $P_2O_5$) are dissolved in about 4,000 parts of water at 0 to 10° C.. The two aqueous solutions prepared above are fed simultaneously into a stirred vessel containing about 3,000 parts of water at about 40° C. at the rate of 75 to 80 parts per minute. The temperature of the reaction slurry is held at about 40° C. with a heat exchanger coil. A pH of from about 3.0 to about 5.0 is maintained by the addition of a 10% aqueous solution of hydrochloric acid. Stirring is discontinued and about 8,000 parts of liquid are then decanted from a solid precipitate. The precipitate is washed with water on a filter and air dried. The calcium oxide content of about 33.0% is determined by dissolving and hydrolyzing a sample of the precipitated product in mineral acid followed by the oxalate precipitation-$KMnO_4$ titration method for CaO as described in Willard and Furman, Elementary Quantitative Analysis, 3rd ed., D. Van Nostrand Company, New York (1940).

A $P_2O_5$ content of about 43.5% of a sample of the product is determined by the method of Van Wazer et al. described in Analytical Chemistry, 26 1755 (1954) after ion exchange of the metal ions by a cationic exchange resin.

Ignition loss measurements determine the molecular bound water content of a sample of the product to be 22.9% $H_2O$.

The following analyses of P species present as ortho, end and middle groups are obtained by the method described in Analytic Chemistry, 26 1755, supra.

P species present:
  Ortho _____ 0.8
  Ends _____ 98.4
  Middles _____ 0.8

From the above analyses it is apparent that the product produced is $Ca_2P_2O_7 \cdot 4H_2O$. The yield based upon the pyrophosphoric acid charged is about 98%.

Using substantially the same method and analysis as above only holding reaction temperature of above 45° C. and below 65° C., the product produced is identified as $Ca_2P_2O_7 \cdot 2H_2O$.

At temperatures above 80° C. and below 100° C., $Ca_2P_2O_7$ is produced by this method.

EXAMPLE 2

About 356 parts of crystalline pyrophosphoric acid are dissolved in about 3200 parts of water at a temperature of from about 0° to 10° C. The temperature of this 10% aqueous solution of pyrophosphoric acid is maintained at below 10° C. until it is added at the rate of about 100 parts per minute to a stirred reaction vessel equipped with cooling coils containing about 350 parts of magnesium carbonate and about 3500 parts of water at a temperature of about 25° C. The temperature of the reaction medium while the pyrophosphoric acid is being added is maintained at about 24–30° C. by circulating brine at about 15° C. through the cooling coils.

A granular precipitate is formed and after about one hour after all of the pyrophosphoric acid solution is added, the granular material is separated from the liquid solution phase by filtration.

Using the analytical techniques as in Example 1, the following analyses are obtained on samples of the crystalline material:

MgO _____ percent __ 23.4
$P_2O_5$ _____ do ____ 42.7
P as ortho _____ do ____ 0.0
P as ends _____ do ____ 100.0
P as middles _____ do ____ 0.0
Loss on ignition _____ 34.2

Upon heating the material loses water over the temperature of from 147–260° C. and becomes anhydrous at 260° C.

From the above analysis it is apparent that the material produced is $Mg_2P_2O_7 \cdot 6H_2O$.

EXAMPLE 3

About 2,000 parts of water are charged to a stirred reaction vessel equipped with a cooling coil. The temperature is maintained at about 30° C. while about 1800 parts of a 10% aqueous solution of pyrophosphoric acid and about 740 parts of an aqueous solution of calcium hydroxide are added over about a 2 hour period while the contents of the vessel are being stirred. The pH of the reaction medium is measured at from about 3.5 to about 4.2 throughout the addition of the solutions. About ½ hour after the solutions are added, the stirring is discontinued and a granular precipitate settles from the the reaction medium. Analysis of a sample of the material shows it to be the mixed alkaline earth metal-alkali metal pyrophosphate $CaNa_2P_2O_7$.

Other mixed calcium-alkali metal pyrophosphates can be prepared by substituting substantially molar equivalent amounts of alkali metal hydroxides for the sodium hydroxide of this example. Suitable alkali metal hydroxides include potassium and lithium hydroxide, for example. Additionally, substantially molar equivalent amounts of ammonium hydroxide can be used to produce the mixed calcium-ammonium pyrophosphate. If desired, the alkaline earth metal salts of the inorganic acids such as calcium chloride, calcium nitrate, calcium sulfate, magnesium chloride, magnesium nitrate, magnesium carbonate can be substituted for the calcium hydroxide in substantially molar equivalent amounts to thereby produce the corresponding alkaline earth metal-alkali metal pyrophosphates or the alkaline earth metal-ammonium pyrophosphates. The alkali metal salts such as sodium and potassium carbonate, sodium and potassium chloride can also be substituted in substantially molar equivalent amounts for the sodium hydroxide of this example, and thereby produce the corresponding mixed alkaline earth metal-alkali metal pyrophosphates.

What is claimed is:

1. A process for producing crystalline pyrophosphates selected from the group consisting of alkaline earth metal pyrophosphates, alkaline earth metal-alkali metal pyrophosphates, alkali earth metal-ammonium pyrophosphates and mixtures thereof comprising (a) forming a reaction medium by adding in any order: solid pyrophosphoric acid, water and an alkaline earth metal source and (b) maintaining said reaction medium at a pH of from about 1 to about 6, at a temperature of from about 0° C. to about 100° C. and at a water concentration of at least about 80% by weight based upon the total weight of said reaction medium for a time sufficient to form said crystalline pyrophosphates.

2. A process according to claim 1 wherein said crystalline pyrophosphate is an alkaline earth metal pyrophosphate.

3. A process according to claim 2 wherein said reaction medium is relatively free of alkali metal ions and ammonium ions and wherein the purity of said crystalline alkaline earth metal pyrophosphate is at least about 90%.

4. A process according to claim 3 wherein the water concentration is from about 85% to about 95% by weight based upon the total weight of the reaction medium.

5. A process according to claim 4 wherein said alkaline earth metal is magnesium and said crystalline alkaline earth metal pyrophosphate is essentially $Mg_2P_2O_7.6H_2O$.

6. A process according to claim 4 wherein said alkaline earth metal is calcium and said temperature is from about 0° C. to about 20° C. and said crystalline alkaline earth metal pyrophosphate is essentially $Ca_2P_2O_7.4H_2O$.

7. A process according to claim 4 wherein said alkaline earth metal is calcium and said temperature is from about 45° C. to about 60° C. and alkaline earth metal pyrophosphate is essentially $Ca_2P_2O_7.2H_2O$.

8. A process according to claim 4 wherein said alkaline earth metal is calcium and said temperature is from about 80° C. to about 100° C. and said crystalline alkaline earth metal pyrophosphate is essentially anhydrous calcium pyrophosphate.

9. A process according to claim 1 wherein said reaction medium is formed by adding in any order: solid pyrophosphoric acid, water, an alkaline earth metal source and an alkali metal source and said crystalline pyrophosphate is an alkaline earth metal-alkali metal pyrophosphate.

10. A process according to claim 9 wherein said alkaline earth metal is selected from the group consisting of calcium, magnesium, barium and strontium and wherein said alkali metal is selected from the group consisting of sodium and potassium.

11. A process according to claim 1 wherein said reaction medium is formed by adding in any order: a solid pyrophosphoric acid, water, and ammonium source and an alkaline earth metal source selected from the group consisting of calcium magnesium, barium and strontium source and wherein said crystalline pyrophosphate is an alkaline earth metal-ammonium pyrophosphate.

No references cited.

OSCAR R. VERTIZ, *Primary Examiner.*

L. A. MARSH, *Assistant Examiner.*